United States Patent [19]

Yoshida et al.

[11] Patent Number: 5,068,136
[45] Date of Patent: Nov. 26, 1991

[54] FIVE-LAYERED CONTAINER

[75] Inventors: Yozo Yoshida; Tetuji Saitou, both of Hiratsuka; Yoshiaki Momose, Hatano, all of Japan

[73] Assignee: Mitsubishi Gas Chemical Company, Inc., Tokyo, Japan

[21] Appl. No.: 436,787

[22] Filed: Nov. 15, 1989

Related U.S. Application Data

[63] Continuation-in-part of Ser. No. 284,119, Dec. 14, 1988, abandoned.

[30] Foreign Application Priority Data

Dec. 22, 1987 [JP] Japan ................... 62-322697

[51] Int. Cl.$^5$ ............ B65D 23/00; B32B 27/28
[52] U.S. Cl. ................... 428/35.7; 215/12.1; 428/36.7; 428/475.2
[58] Field of Search ............ 428/35.7, 36.6, 36.7, 428/475.2, 480, 483; 215/12.1

[56] References Cited

U.S. PATENT DOCUMENTS

| | | | |
|---|---|---|---|
| 4,501,781 | 2/1985 | Kushida et al. | 428/36.7 |
| 4,564,541 | 1/1986 | Taira et al. | 428/36.7 |
| 4,728,549 | 3/1988 | Shimizu et al. | 428/36.7 |
| 4,743,479 | 5/1988 | Nakamura et al. | 428/36.7 |

FOREIGN PATENT DOCUMENTS

| | | |
|---|---|---|
| 50-96652 | 7/1975 | Japan . |
| 55-154234 | 12/1980 | Japan . |
| 57-160 | 1/1982 | Japan . |
| 57-60020 | 12/1982 | Japan . |
| 59-204552 | 11/1984 | Japan . |
| 62-71622 | 4/1987 | Japan . |
| 62-77908 | 4/1987 | Japan . |

Primary Examiner—James J. Seidleck
Attorney, Agent, or Firm—Wenderoth, Lind & Ponack

[57] ABSTRACT

A five-layered container formed by biaxial orientation blow molding of an injection-molded, five layered-structured parison, wherein central, innermost and outermost layers comprise a resin A, two intermediate layers between the innermost layer and the central layer and between the outermost layer and the central layer comprise a resin B, the resin A comprises a polyester resin containing ethylene terephthalate as a main recurring unit, and the resin B comprises a mixture of a polyester resin containing ethylene terephthalate as a main recurring unit with polyarylate or a resin produced by an ester-exchange reaction of said polyester resin with polyarylate, and a m-xylene group-containing polyamide resin.

9 Claims, 1 Drawing Sheet

FIVE-LAYERED CONTAINER

This application is a continuation-in-part of now abandoned application Ser. No. 07/284,119 filed Dec. 14, 1988.

FIELD OF THE INVENTION:

The present invention relates to a five-layered container formed by biaxial orientation blow molding. More specifically, it relates to a five-layered container having excellent gas barrier properties, heat resistance, mechanical strength, transparency, resistance to interlayer delamination and moldability, which is excellent in practical use.

PRIOR ART OF THE INVENTION:

Polyethylene terephthalate containers formed by injection molding and biaxial orientation blow molding hardly show deterioration of various contents filled therein, and they have high rigidity and also have high mechanical strength owing to orientation. For this reason, these containers are now widely used as containers for foods such as carbonated beverages, etc., and cosmetics.

Since, however, polyethylene terephthalate containers have poor gas barrier properties against oxygen gas, they suffer the disadvantage of short shelf life for contents which are susceptible to oxygen gas.

Further, polyethylene terephthalate has a glass transition point in the vicinity of 70° C. and containers thereof have strain caused at the time of blow molding. Therefore, it has not been possible to fill polyethylene terephthalate containers with contents having a temperature of 65° C. or above.

Heat set technology has been developed which comprises holding a wall portion of a blow molded container under heat treatment at 100° to 130° C. to remove residual strain, and there has also been developed a technique of whitening an open end portion of a container by crystallization by heating the open end portion with hot air or a heater. These technologies have made possible heat resistant polyethylene terephthalate containers which can endure filling with contents having a temperature of as high as 85° C.

However, such processes require a long period of processing time for heat setting and whitening of an open end portion, and the manufacturing steps for these processes are made complicated.

One solution for the above problems is proposed by Japanese Laid-Open Patent Publications Nos. 96652/1975 and 160/1982 and Japanese Patent Publication No. 60020/1982. That is, they propose polymer alloys obtained by melt-blending polyethylene terephthalate and polyarylate and containers thereof, and these containers are now put to practical use as heat resistant ones. However, it is pointed out that the gas barrier properties and moldability are degraded.

Further, in order to improve the heat resistance of polyethylene terephthalate containers, another method is proposed which comprises combining polyethylene terephthalate with a heat resistant resin, and, for example, Japanese Laid-Open Patent Publications Nos. 154234/1980, 204552/1984, 71622/1987 and 77908/1987 describe multi-layered containers using a resin composition of polyarylate and polyethylene terephthalate. On the other hand, as means of covering the insufficient gas barrier properties of the polyethylene terephthalate containers, there is known a three-layered container comprising inner and outer layers of a polyethylene terephthalate resin and a central layer of a m-xylylene group-containing polyamide resin which is a barrier material, and produced by using an injection molding machine having two cylinders (U.S. Pat. No. 4,353,901), and further, known as such a means is another five-layered container comprising inner surface, outer surface and intermediate layers of a polyethylene terephthalate resin and two intermediate layers of a m-xylylene group-containing polyamide resin (U.S. Pat. No. 4,728,549). Furthermore, U.S. Pat. No. 4,501,781 discloses a three-layered container having improved resistance to delamination and improved gas barrier properties, which comprises inner surface and outer surface layers formed of a polyester resin and an intermediate layer formed of a m-xylylene group-containing polyamide resin. U.S. Pat. No. 4,743,479 discloses a three-layered container having improved heat resistance, which is formed of inner and outer layers of a polyester resin and an intermediate layer of a polyarylate polyethylene terephthalate resin.

The five-layered container disclosed in U.S. Pat. No. 4,728,549, however, has a defect that they undergo delamination between the layer of a m-xylylene-containing polyamide resin (each of the two intermediate layers) and the layer of a polyester resin (each of the innermost, central and outermost layers) when an impact works on them. And that portion of the container which has undergone interlayer delamination becomes poor in transparency, which degrades commercial value of the container. The container disclosed in U.S. Pat. No. 4,501,781 has insufficient transparency and suffers container deformation and leakage when it is filled with a high-temperature content (e.g. 85° C.) for sterilizing treatment, since the dimensional contraction ratio of its open end portion and the volume contraction ratio of the wall of the container body are large. For these reasons, this container does not sufficiently satisfy the performance required for containers for practical use. Concerning the container disclosed in U.S. Pat. No. 4,743,479, due to the use of a polyarylate polyethylene terephthalate resin as an intermediate layer, the container is poor in the gas barrier properties as compared with containers using a m-xylylene group-containing polyamide resin as an intermediate layer, and hence its practical value as a container for contents susceptible to oxygen gas is insufficient.

SUMMARY OF THE INVENTION

It is an object of this invention to provide a five-layered container having excellent gas barrier properties, heat resistance, mechanical strength, transparency, resistance to interlayer delamination and moldability, and satisfying these properties for practical use.

It is another object of this invention to provide a five-layered container excellent especially in both heat resistance and gas barrier properties.

It is further another object of this invention to provide a five-layered container having excellent properties described above and formed by biaxial orientation blow molding.

According to this invention there is provided a five-layered container formed by biaxial orientation blow molding of an injection-molded, five layer-structured parison, wherein central, innermost and outermost layers comprise a resin A, two intermediate layers between the innermost layer and the central layer and between the outermost layer and the central layer comprise a resin B, the resin A comprises a polyester resin containing ethylene terephthalate as a main recurring unit, and the resin B comprises a mixture of a polyester resin containing ethylene terephthalate as a main recurring unit with polyarylate or a resin produced by an ester-exchange reaction of said polyester resin with polyarylate, and a m-xylylene group-containing polyamide resin.

DETAILED DESCRIPTION OF THE INVENTION

The present inventors have made diligent studies of the manufacture and development of a five-layered container having excellent gas barrier properties, heat resistance, mechanical strength, transparency, resistance to interlayer delamination and moldability and satisfying these properties for practical use. As a result, they have succeeded in development of the five-layered container of the present invention by finding that the above resin combination and layer structure can achieve all the above properties.

Namely, the five-layered container using the novel combination of resins and layer structure of the present invention can, surprisingly, overcome the foregoing various problems of the various resin combinations and layer structures of prior techniques.

Further, a five-layered container having innermost, outermost and central layers of a mixture of a polyester resing with a m-xylylene group-containing polyamide resin is not included in the scope of the present invention, since such a container exhibits deteriorated transparency and hence its total value as a practical, commercial product is degraded, although its gas barrier properties are improved.

Furthermore, a three-layered container having inner and outer surface layers of a polyester resin and an intermediate layer of a polyester resin, polyarylate and a m-xylylene group-containing polyamide resin is outside the scope of the present invention. That is because the form of the portions of the intermediate layer which form the open end and shoulder portions of a container become corrugate-shaped in the direction of the container height at the time of molding the intermediate layer, and hence the various properties such as heat resistance, etc., are made nonuniform.

Figure 1:
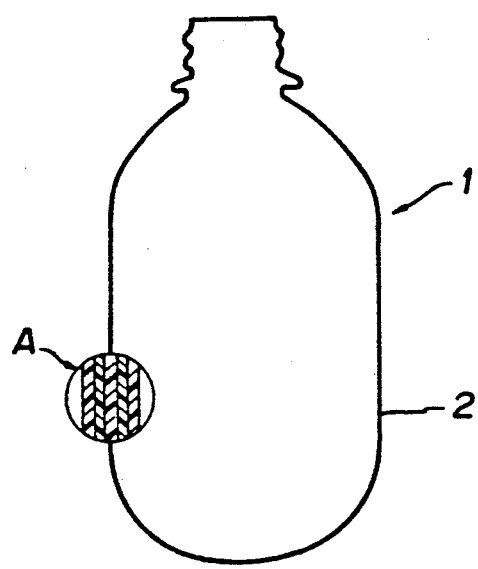
FIG. 1 is a front view of a five-layered container according to the present invention and a partial cross sectional view of same.
Figure 2:
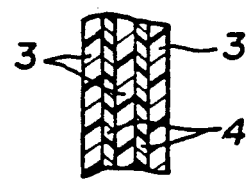
FIG. 2 is an enlarged cross sectional view showing the layer structure of the body portion A of the container shwon in FIG. 1.

FIG. 1 shows a front view of a five-layered container according to the present invention and an enlarged cross sectional view of a portion of same. As shown in FIG. 1, A-portion and FIG. 2, a thin body portion 2 of the five-layered container is formed of innermost, outermost and central layers 3 of the resin A and two intermediate layers 4 of the resin B.

In the present invention, the polyester resin containing ethylene terephthalate as a main recurring unit stands for polyesters which usually have an acid content comprising not less than 80 mole % of terephthalic acid and a glycol content comprising not less than 80 mole %, preferably not less than 90 mole %, of ethylene glycol. Examples of the other acids for the remaining portion of the acid content include isophthalic acid, hexahydroterephthalic acid, biphenyl ether-4,4-dicarboxylic acid, naphthalene-1,4-dicarboxylic acid, and naphthalene-2,6-dicarboxylic acid. And examples of the other glycols for the remaining portion of the glycol content include propylene glycol, 1,4-butanediol, neopentyl glycol, dietylene glycol, cyclohexanedimethanol, 2,2-bis(4-hydroxyethoxyphenyl)propane, and the like.

A polyester resin containing p-oxybenzoate, etc., as oxyacids can be also cited.

The above thermoplastic polyester resins have an intrinsic viscosity, measured at 25° C. by using a mixture of phenol and tetrachloroethane (6:4 by weight) as a solvent, of 0.55 to 1.4, preferably 0.65 to 1.4.

If the above intrinsic viscosity is less than 0.55, not only it is difficult to obtain a parison in a transparent noncrystalline state, but also the mechanical strength of the resultant container is insufficient.

If the above intrinsic viscosity exceeds 1.4, a resin flow passage of a mold suffers increased resistance, and a heavy load is exerted on a cylinder. As a result, it is impossible to obtain any parison having excellent dimensional stability by injection molding.

In the present invention, the "polyarylate" represents those obtained from aromatic dicarboxylic acid or its derivative and dihydric phenol or its derivative.

As a material for the above polyarylate, any aromatic dicarboxylic acids may be used, if they react with dihydric phenol to give a satisfactory polymer, and two or more of such dicarboxlylic acids may be used in combination.

As preferable aromatic dicarboxylic acids, it is possible to cite terephthalic acid and isophthalic acid. In particular, a mixture of these is preferable in view of melt-processability and performace.

When the mixture of terephthalic acid and isophthalic acid is used, the terephthalic acid/isophthalic acid mixing ratio is 9/1 to 1/9 (molar ratio), and the ratio of 7/3 to 3/7 (molar ratio) is preferable in view of melt-processability and performances.

Preferable examples of the dihydric phenol include 2,2-bis(4-hydroxyphenyl)propane, 2,2-bis(4-hydroxy-3,5-dibromophenyl)propane, 2,2-bis(4-hydroxy-3,5-dichlorophenyl)propane, 4,4'-dihydroxyphenylsulfon, 4,4'-dihydroxydiphenyl ether, 4,4'-dihydroxydiphenylsulfide, 4,4'-dihydroxydiphenyl methane, 2,2'-bis(4-hydroxy-3,5-dimethylphenyl)propane, 1,1-bis(4-hydroxyphenyl)ethane, 1,1-bis(4-hydroxyphenyl)cyclohexane, 4,4'-dihydroxyphenyl, benzoquinone, and the like. These may be used alone or in combination. Besides these p-substituted dihydric phenols, other isomers may be used, and further, up to 30 mole % of ethylene glycol, propylene glycol, or the like may be used in combination with dihydric phenol.

The most typical example of the dihydric phenols is 2,2-bis(4-hydroxyphenyl)propane usually called bisphenol-A, and the bisphenol-A is most preferably usable in view of physical properties.

On the basis of the foregoing discussion, examples of the most preferable polyarylate in the present invention are those obtained from a mixture of terephthalic acid with isophthalic acid or derivatives thereof and dihydric phenol, especially bisphenol-A or its derivative.

In the present invention, the "m-xylene group-containing polyamide resin" stands for polymers containing at least 70 mole % of structural units obtained from m-xylylene diamine alone or a mixture of m-xylylene diamine with not more than 30% by weight, based on the total mixture weight, of p-xylylene diamine and α.ω-aliphatic dicarboxylic acid having 6 to 10 carbon atoms.

Examples of the above polymers include homopolymers such as poly-m-xylylene adipamide, poly-m-xylylene sebacamide, poly-m-xylylene suberamide, etc., copolymers such as m-xylylene/p-xylylene adipamide copolymer, m-xylylene/p-xylylene azelamide copolymer, etc., and copolymers composed of said homo- or copolymers with aliphatic diamine such as hexamethylenediamine, aromatic diamine such as p-bis-(2-aminoethyl)benzene, aromatic dicarboxylic acid such as terephthalic acid, lactam such as ε-caprolactam, or aromatic aminocarboxylic acid such as ω-aminocarboxylic acid, p-aminobenzoate, or the like.

Further, these polymers may contain polymers such as nylon 6, nylon 66, nylon 610, nylon 11, etc.

The relative viscosity, measured in a solution, at 25° C., of 1 g of a sample resin in 100 ml of 96% sulfuric acid, of these m-xylylene group-containing polyamide resins is 1.5 to 4.0, preferably 2.0 to 4.0. That is because the viscosities of the polyamide resin and the polyester resin are adjusted to be nearly identical with each other at a parison injection molding temperature in a resin flow passage. If there is a large difference between the viscosities of these resins, it is difficult to form a parison having a uniform thickness by injection molding.

In the present invention, it is possible to incorporate a coloring agent, UV absorber, etc., into both or one of the resins A and B in such an amount that does not impair the object of the present invention.

The resin B of the present invention may be a mixture obtained by mixing polyarylate, a m-xylylene group-containing polyamide resin and a polyester resin containing ethylene terephthalate as a main recurring unit, or a product obtained by carrying out an ester-exchange reaction of a mixture of polyarylate with a polyester resin containing ethylene terephthalate as a main recurring unit while the mixture is melted and incorporating a m-xylylene group-containing polyamide resin into the ester-exchange reaction product.

The above ester-exchange reaction is, specifically, carried out by melt-extrusion or stirring the mixture in a reactor while it is melted.

In view of the moldability, heat resistance, etc., of the five-layered container of the present invention, it is desirable to carry out the above ester-exchange reaction of polyarylate.

The five-layered container of this invention is formed by biaxial orientation blow molding of a parison having a five-layered structure in which the innermost, outermost and central layers comprise an identical resin (resin A) and the two intermediate layers comprise another identical resin (resin B).

The following is an explanation of the process for manufacturing such a parison.

Figure 3:
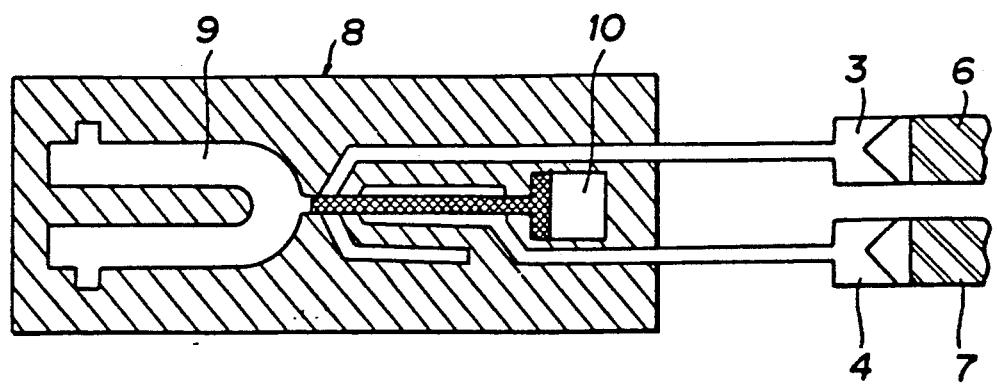
FIG. 3 is a schematic side view of an injection molding machine usable for the manufacture of a five-layered container according to the present invention.

FIG. 3 shows a schematic side view of an injection molding machine usable for the manufacture of the parison in the present invention.

Like usual injection molding machines, the injection molding machine shown in FIG. 3 has a cylinder (6) for the resin A and a cylinder (7) for the resin B, and the resin A (3) and resin B (4), individually melted in the cylinders, can be injected into a cavity (9) of a mold (8), separately.

In injection molding, at first, part of the molten resin A is injected from the cylinder (6) into the cavity (9). The injection of the resin A is stopped, and the molten resin B is injected from the cylinder (7) into the cavity (9). Thereafter, the injection of the resin B is stopped, and the molten resin A is re-injected to fill the cavity (9) completely. And then, a gate-cutting pin located at fore-end of an air cylinder (10) is moved to the cavity side to give a five-layered parison having its bottom side and open end portion sealed with resin A.

Then, the above five-layered parison is reheated to a temperature of not lower than 100° C., then transferred into a mold for a container and subjected to biaxial orientation blow molding with an orientation rod and air pressure to give a five-layered container.

In the present invention, the layer of resin A gives mechanical strength and the layer of resin B gives heat resistance and gas barrier property. The copresence of polyethylene terephthalate both in resin A and resin B makes the interlayer bond better between layers of resins A and B, and as a result, the heat resistance and gas barrier property are efficiently exhibited.

Further, since the polyethylene terephthalate used as resin A has excellent transparency, the biaxial orientation blow molding gives five-layered containers having excellent transparency.

In the present invention, it is desirable that the melting viscosities of the resin A and resin B are nearly identical with each other at the time of injection molding.

The proportion of the polyarylate for use can be selected from the range of from 2 to 20% by weight based on the total weight of resins for the container. Since, however, the polyarylate is expensive and poor in transparency, the above proportion is desirably in the range of from 3 to 10% by weight in order to maintain the heat resistance and satisfy the transparency and mechanical strength.

The proportion of the m-xylylene group-containing polyamide resin is in the range of from 1 to 20% by weight based on the total weight of resins for the container, and it is preferably in the range of from 3 to 10% by weight.

If the proportion of the m-xylylene group-containing polyamide resin is less than 1% by weight, the gas barrier properties are not improved. On the other hand, since the m-xylylene group-containing polyamide resin is, in general, inferior to polyethylene terephthalate, etc., in mechanical strength and transparency, the use of more than 20% by weight thereof causes problems in performance, and the gas barrier properties are not improved as expected, either.

According to the present invention, there is provided a five-layered container which not only has excellent gas barrier properties and heat resistance but also has excellent transparency and resistance to interlayer delamination, and which hence has high practical value as a commercial product.

Further, according to the present invention, there is provided a five-layered container having excellent moldability and mechanical strength and having high practical value.

EXAMPLES

The present invention will be illustrated hereinbelow according to Examples. In Examples, the properties, etc., were measured according to the following methods.

(1) Haze:

Measurement was made according to ASTM D1003-61 by using a digital hazemeter (NDH-2D manufactured by Nippon Denshoku Kogyo K. K.)

(2) Oxygen permeability

Measurement was made substantially in accordance with ASTM D3985-81 by using "OX-TRON 100" manufactured by Modern Controls.

Measurement temperature: 20° C.
Interior relative humidity: 100%
Exterior relative humidity: 65%, (3) Evaluation of heat resistance:

Five-layered containers having a volume of 1.5 l (height: 308 mm, body outer diameter: 91.5 mm) were used, and volume contraction ratios of the containers were measured when the containers were filled with hot water having temperatures of 85° C. and 90° C.

Specifically, the containers were filled with water having the above temperatures, sealed with an aluminum cap and left to stand for 5 minutes. Then, the containers were cooled with water and left to stand at room temperature for 1 day, and decreases in volumes of the containers were measured. The resultant volume contraction ratios of the containers are a base for evaluation of heat resistance.

(4) Intrinsic viscosity of polyester resin [$\eta$]:

Measurement was made substantially in accordance with ASTM D2857. As a solvent, phenol/tetrachloroethane mixed solvent having a phenol/chloroethane weight ratio of 6/4 was used.

Measurement temperature: 25° C.;

(5) Relative viscosity of polyamide resin [$\eta_{rel}$]:

Measurement was made substantially in accordance with JIS K6810-1977. 1 g of a resin was dissolved in 100 ml of 96% sulfuric acid as a solvent.

Measurement temperature: 25° C.;

(6) Test on interlayer delamination:

Twenty containers having a volume of 1.5 l were filled with water up to 97% of the total volume of the containers, then sealed with an aluminum cap, and left to stand at room temperature for 1 day. Thereafter, ten of the twenty containers filled with water were allowed to fall, with their bottoms downward, on a concrete surface from a height of 1 m, and the remaining ten containers filled with water were also allowed to fall, with their sides downward, on the same surface from the same height. And the number of containers having caused interlayer delamination on the body portion was counted.

EXAMPLE 1

A polyethylene terephthalate having an intrinsic viscosity of 0.83 (to be abbreviated as PET hereinbelow) was used as the resin A.

As the resin B, there were used a poly-m-xylylene adipamide (to be abbreviated as N-MXD6 hereinbelow, trade name: MX nylon 6007 manufactured by Mitsubishi Gas Chemical Co., Inc., relative viscosty: 2.1) and a resin composition of a polyester resin containing ethylene terephthalate as a main recurring unit with polyarylate. The resin composition of a polyester resin with polyarylate was a polymer alloy composed of PET and polyarylate. [Said polymer alloy is "U-8400" manufactured by Unitika K. K., which is composed of 42 parts by weight of a polyarylate obtained from a mixture of terephthalic acid with isophthalic acid as aromatic dicarboxylic acid (having a mixture molar ratio of 1:1) and bisphenol A as dihydric phenol, and 58 parts by weight of polyethylene terephthalate.] The N-MXD6: U-8400 composition ratio of the resin B was 20:80 by weight.

The resin A had a melt viscosity of 6,500 poise at 270° C. and the U-8400 in the resin B had a melt viscosity of 6,000 at 280° C.

At first, an injection molding machine having two cylinders was used to injection-mold five-layered parisons having innermost, outermost and central layers of the resin A and two intermediate layers of the resin B and having an outer diameter of 26 mm, height of 145 mm and thickness of 4.5 mm.

The amounts of the resins A and B in the above injection molding were as follows.

1st injection (resin A): 35%
2nd injection (resin B): 25%
3rd injection (resin A): 40%.

The temperatures in the above injection molding were set as follows.

Injection cylinder for resin A: 280° C.
Injection cylinder for resin B: 270° C.
Resin flow passage in mold: 280° C.
Mold-cooling water: 15° C.

Then, the resultant parisons were transferred to a biaxial orientation blow molding machine, heated until the temperature on the surface of the parisons became 100° to 110° C., transferred to a mold for a container and were subjected to biaxial orientation blow molding under the conditions that the feed rate of an orientation rod was 20 cm/sec., the orientation blowing pressure was 20 kg/cm$^2$, the axial orientation ratio was 3.0 and the circumferential orientation ratio was 2.7, thereby to give five-layered containers having an average body portion thickness of 0.4 mm, an inner volume of 1.5 l, outer diameter of 91.5 mm, height of 308 mm and weight of 64.5 g.

The resultant five-layered containers were subjected to tests for evaluation of oxygen permeability and heat resistance. Table 1 shows the results of the evaluation.

The haze of the body portion of the obtained five-layered containers was measured to show 4.45%.

COMPARATIVE EXAMPLE 1

The procedure of Example 1 was repeated by using, as resin A, a resin composed of a mixture of 95% by weight of PET having an intrinsic viscosity of 0.83 and 5% by weight of N-MXD6 (trade name: MX nylon 6007 made by Mitsubishi Gas Chemical Co., Inc.) having a relative viscosity of 2.1 and as resin B, the same polymer alloy (trade name: U-8400 made by Unitika K. K.) as that used in Example 1, to injection-mold five-layered parisons. The resultant parisons were subjected to biaxial orientation blow molding in the same way as in Example 1 to give five-layered containers having an inner volume of 1.5 l.

The above five-layered containers were subjected to tests for evaluation of oxygen permeability, heat resistance and haze.

Table 1 shows the results of the evaluation.

COMPARATIVE EXAMPLE 2

The procedure of Example 1 was repeated to injection-mold a five-layered parison by using PET having an intrinsic viscosity of 0.83 as resin A and the same polymer alloy (trade name: U-8400 made by Unitika K. K.) as that used in Example 1 as resin B. Then, the above parisons were subjected to biaxial orientation blow molding in the same way as in Example 1 to give five-layered containers having an inner volume of 1.5 l. The resultant five-layered containers were subjected to tests for evaluation of oxygen permeability, heat resistance and haze. Table 1 shows the results of the evaluation.

COMPARATIVE EXAMPLE 3

The procedure of Example 1 was repeated to injection-mold five-layered parisons by using PET having an intrinsic viscosity of 0.72 as resin A and N-MXD6, which was the same as that used in Example 1, as resin B. Then, the resultant parisons were heated until the temperature on the surface thereof became 80° to 100° C., transferred into a container mold at 110° C., and held at 110° C. for 15 seconds and the parisons were subjected to biaxial orientation blow molding in the same way as in Example 1, to give five-layered containers having an inner volume of 1.5 l. Separately, as to some of the containers, the above heat treatment at 110° C. for 15 seconds was omitted. Then, the container wall portion thereof was elliptically deformed when they were filled with hot water having a temperature of 85° C. The remaining five-layered containers, heat-treated, were subjected to tests for evaluation of oxygen permeability, heat resistance and haze. Table 1 shows the results of the evaluation.

The data in Table 1 shows that the five-layered containers obtained in Example 1 have decreased oxygen permeabilities owing to the use of MX nylon as compared with those of Comparative Example 2, i.e., the gas barrier properties thereof were improved. Further, it is seen that the heat resistances are nearly equal among the containers obtained in these two Examples. And the five-layered containers in Example 1 have shown improved heat resistence as compared with those of Comparative Example 3, and the gas barrier properties are nearly equal among these three Examples. Table 2 shows the results of evaluation of interlayer delamination on the containers obtained in Example 1 and Comparative Example 3.

Interlayer delamination was observed on the containers obtained in Comparative Example 3, i.e. on the bottom portion when the containers were allowed to fall with the bottom downward, and on the body portion when they were allowed to fall with the side downward.

TABLE 2

|  | Example 1 | C-Example 3 |
|---|---|---|
| Numbers of containers suffering interlayer delamination: |  |  |
| Falling with the bottom downward | 0 | 10 |
| Falling with the side downward, | 0 | 10 |

COMPARATIVE EXAMPLE 4

In an injection molding machine shown in FIG. 3, the cylinder 3 was charged with PET and the cylinder 4 with a blend of PET with N-MXD6 (having a PET/N-MXD6 blending ratio of 77/23), and a three-layered parison was injection-molded which had inner surface and outer surface layers of PET and an intermediate layer of the blend. The above PET was the same as that used in Example 1.

The injection amounts the above resins were as follows.

1st injection (PET): 70 vol. %
2nd injection (blend): 30%.

The temperatures in the above injection molding were set as follows.

Injection cylinder 3: 280° C.
Injection cylinder 4: 270° C.
Resin flow passage in mold: 280° C.
Mold-cooling water: 15° C.

The resultant parison was transferred to a biaxial orientation blow-molding machine, and blow-molded with an orientation ratio, in the axial direction, of 3.0 and an orientation ratio, in the circumferential direction, of 4.0 under the same conditions as those in Example 1, to give a three-layered container having an average body portion thickness of 0.35 mm, a total height of 310 mm, a maximum diameter of 93.5 mm, a volume of 1.5 l and a weight of 64.5 g.

The haze of the resultant three-layered container was measured to show 16.0%, whereas the haze of the container obtained in Example 1 was 4.45%. Namely, a clear difference of transparency was observed.

What we claim is:

1. A five-layered container formed by biaxial orientation blow molding of an injection-molded, five layer-structure parison, wherein:

the central, innermost and outermost layers comprise resin A,
the intermediate layer between the innermost layer and the central layer comprises resin B,
the intermediate layer between the outermost layer and the central layer comprises resin B,

TABLE 1

|  |  | Example 1 | C-Example 1 | C-Example 2 | C-Example 3 |
|---|---|---|---|---|---|
| Resin Composition | Resin A (wt. %) | PET: 100 | PET: 90 N-MXD6: 5 | PET: 100 | PET: 100 |
|  | Resin B (wt. %) | U-8400: 80 N-MXD6: 20 | U-8400: 100 | U-8400: 100 | N-MXD6: 100 |
| Proportions of resins in container: |  |  |  |  |  |
| Polyarylate |  | 4.2 wt. % | 5.2 wt. % | 5.2 wt. % | 0 wt. % |
| N-MXD6 |  | 2.3 wt. % | 4.0 wt. % | 0 wt. % | 4.0 wt. % |
| Results of evaluation: |  |  |  |  |  |
| Amount of permeated oxygen (ml/container/day): |  | 0.0439 | 0.0416 | 0.0730 | 0.0420 |
| Volume contraction ratio |  |  |  |  |  |
| (1) at 85° C. |  | 1.2% | 1.6% | 1.2% | 5.0% |
| (2) at 90° C. |  | 3.4% | 3.2% | 2.7% | 7.5% |
| Haze: |  | 4.45% | 19.7% | 4.30% | 1.6% | the resin A comprises a polyester resin containing ethylene terephthalate as the main recurring unit, and the resin B comprises a mixture of a polyester resin containing ethylene terephthalate as the main recurring unit with polyarylate and a m-xylylene group-containing polyamide resin, or comprises a resin produced by an ester-exchange reaction of a polyester resin containing ethylene terephthalate as the main recurring unit with polyarylate and a m-xylylene group-containing polyamide resin.

2. A five-layered container according to claim 1, wherein the amount of the polyarylate in the mixture or of the polyarylate portion in the resin produced by the ester-exchange reaction is 2 to 20% by weight based on the total amount of the resins A and B.

3. A five-layered container according to claim 1 wherein the amount of the m-xylylene group-containing polyamide resin is 1 to 20% by weight based on the total amount of the resins A and B.

4. A five-layered container according to claim 1 wherein the polyester resin has an acid content comprising not less than 80 mole % of terephthalic acid and a glycol content comprising not less than 80 mole % of ethylene glycol.

5. A five-layered container according to claim 4 wherein the polyester resin has an intrinsic viscosity of 0.55 to 1.4.

6. A five-layered container according to claim 1 wherein the polyarylate is a product obtained from aromatic carboxylic acid and dihydric phenol.

7. A five-layered container according to claim 6 wherein the aromatic carboxylic acid is a mixture consisting of terephthalic acid with isophthalic acid and having a terephthalic acid/isophthalic acid molar ratio of from 9/1 to 1/9.

8. A five-layered container according to claim 1 wherein the m-xylylene group-containing polyamide resin is a polymer containing at least 70 mole % of structural units obtained from m-xylylene diamine alone or a mixture of m-xylylene diamine with not more than 30% by weight, based on the total mixture weight, of p-xylylene diamine and $\alpha.\omega$-aliphatic dicarboxylic acid having 6 to 10 carbon atoms.

9. A five-layered container according to claim 8 wherein the m-xylylene group-containing polyamide resin has a relative viscosity of 1.5 to 4.0.

* * * * *